(12) United States Patent
Gloede et al.

(10) Patent No.: US 12,525,850 B2
(45) Date of Patent: Jan. 13, 2026

(54) COOLANT SUPPLY SYSTEM FOR AN ELECTRIC MACHINE

(71) Applicant: AUDI AG, Ingolstadt (DE)

(72) Inventors: Harald Gloede, Pförring (DE); Christian Prütting, Kösching (DE)

(73) Assignee: Audi AG, Ingolstadt (DE)

( * ) Notice: Subject to any disclaimer, the term of this patent is extended or adjusted under 35 U.S.C. 154(b) by 202 days.

(21) Appl. No.: 18/576,491

(22) PCT Filed: Jun. 20, 2022

(86) PCT No.: PCT/EP2022/066647
§ 371 (c)(1),
(2) Date: Jan. 4, 2024

(87) PCT Pub. No.: WO2023/280553
PCT Pub. Date: Jan. 12, 2023

(65) Prior Publication Data
US 2024/0313621 A1    Sep. 19, 2024

(30) Foreign Application Priority Data
Jul. 7, 2021   (DE) .......................... 102021117520.8

(51) Int. Cl.
*H02K 9/193* (2006.01)
*H02K 5/16* (2006.01)
*H02K 5/20* (2006.01)

(52) U.S. Cl.
CPC .............. *H02K 9/193* (2013.01); *H02K 5/16* (2013.01); *H02K 5/203* (2021.01)

(58) Field of Classification Search
CPC ............................. H02K 5/161; H02K 5/203
See application file for complete search history.

(56) References Cited

U.S. PATENT DOCUMENTS

| | | | |
|---|---|---|---|
| 2011/0084561 A1* | 4/2011 | Swales | H02K 11/05 180/65.26 |
| 2012/0049665 A1* | 3/2012 | Garriga | F16C 37/007 310/54 |

(Continued)

FOREIGN PATENT DOCUMENTS

| | | |
|---|---|---|
| DE | 102010047507 A1 | 6/2011 |
| DE | 112012003305 T5 | 5/2014 |

(Continued)

OTHER PUBLICATIONS

International Search Report and Written Opinion issued on Oct. 14, 2022, in corresponding International Application No. PCT/EP2022/066647, 15 pages.

(Continued)

*Primary Examiner* — Oluseye Iwarere
*Assistant Examiner* — Masoud Vaziri
(74) *Attorney, Agent, or Firm* — Maier & Maier, PLLC

(57) ABSTRACT

A coolant supply system for an electric machine, in which a free electric machine space is provided in the axial direction between the rotor/stator arrangement and an electric machine housing wall, to which coolant can be applied, in particular for stator cooling. The electric machine has a rotor shaft bearing arrangement in which the rotor shaft is rotatably mounted in a hub section of the electric machine housing wall via a rotary bearing. The bearing opening is sealed to the outside of the housing using a sealing element, with the formation of a free space between the rotary bearing and the sealing element. The electric machine housing wall has a coolant connection, via which coolant can be guided from the electric machine space into the free space.

18 Claims, 3 Drawing Sheets

(56) References Cited

U.S. PATENT DOCUMENTS

| | | |
|---|---|---|
| 2015/0275715 A1 | 10/2015 | Nagata et al. |
| 2018/0248442 A1* | 8/2018 | Fröhlich ................. H02K 5/20 |
| 2019/0115800 A1* | 4/2019 | Yoshinori ............ H02K 5/1737 |
| 2019/0296611 A1* | 9/2019 | Kimoto ................. H02K 5/203 |

FOREIGN PATENT DOCUMENTS

| | | |
|---|---|---|
| DE | 102019207323 A1 | 11/2020 |
| DE | 102019208297 A1 | 12/2020 |
| EP | 0049735 B1 | 12/1984 |

OTHER PUBLICATIONS

Examination Report issued on Mar. 23, 2022, in corresponding German Application No. 102021117520.8, 10 pages.

* cited by examiner

COOLANT SUPPLY SYSTEM FOR AN ELECTRIC MACHINE

FIELD

The invention relates to a coolant supply system for an electric machine in an electrically operated vehicle.

BACKGROUND

Such an electric machine can be implemented as a wet-running electric machine in which the stator, in particular the winding heads of the stator windings, is actively cooled.

Viewed in the axial direction, an exemplary electric machine has a free electric machine space between the rotor/stator arrangement and an electric machine housing wall. Coolant is applied thereto to ensure such stator cooling. The electric machine has a rotor shaft bearing arrangement in which the rotor shaft is rotatably mounted in a bearing opening in a hub section of the electric machine housing wall via a rotary bearing. The bearing opening is sealed to the outside of the housing using a sealing element. A free space that extends in the axial direction between the rotary bearing and the sealing element thus results. The free space is delimited radially inwards by the rotor shaft and delimited radially outwards by the hub section of the electric machine housing wall.

In the prior art, the rotor shaft and thus the rotary bearing can heat up significantly during electric machine operation. Due to different heat-related expansions of the inner ring and the outer ring of the rotary bearing, the rotary bearing clearance can be used up, which is disadvantageous with regard to the rotary bearing service life and the tendency of the bearing arrangement to oscillate.

An electric machine for a vehicle is known from DE 10 2019 207 323 A1. Further cooling/lubricating systems for an electric machine are known from US 2015/0275715 A1, from DE 11 2012 003 305 T5. DE 10 2010 047 507 A1 discloses a generic oil-cooled motor/generator for a motor vehicle drivetrain. An oil-cooled generator is known from EP 0 049 735 B1.

SUMMARY

The object of the invention is to provide a coolant supply system for an electric machine by which a reliable function of the rotary bearing of the rotor shaft is ensured in comparison to the prior art.

The invention is based on a coolant supply system for an electric machine. In the electric machine, viewed in the axial direction, a free electric machine space is provided between the rotor/stator arrangement and an electric machine housing wall. Coolant is applied thereto during electric machine operation to cool the stator. The coolant can be implemented as oil and/or can have a cooling function and a lubricating function. The electric machine has a rotor shaft bearing arrangement in which the rotor shaft is rotatably mounted in a bearing opening in a hub section of the electric machine housing wall via a rotary bearing. The bearing opening is sealed to the outside of the housing using a sealing element. A free space that extends in the axial direction between the rotary bearing and the sealing element results in this way. The free space is delimited radially inwards by the rotor shaft and delimited radially outwards by the hub section of the electric machine housing wall.

According to the disclosure, the following measures are provided for increased cooling of the rotary bearing: The electric machine housing wall has a coolant connection via which coolant can be guided from the electric machine space into the free space. According to the invention, coolant is therefore additionally applied to the free space to cause effective cooling of the rotary bearing. The rotary bearing is therefore cooled on both sides when viewed in the axial direction, on the one hand by coolant from the electric machine space and on the other hand by coolant from the free space.

In a technical implementation, the coolant connection can have an inlet and an outlet. In the electric machine design position, the inlet extends above the rotary bearing, while the outlet extends below the rotary bearing. In this case, the coolant can be guided through the inlet into the free space under the effect of gravity. In the further course, the coolant can be returned via the outlet under the effect of gravity from the free space into the electric machine space.

The electric machine space can be integrated into a coolant-hydraulic circuit in which the coolant, in particular pressurized, is injectable into the electric machine space from radially outside to radially inside via coolant nozzles. Alternatively and/or additionally, the coolant can be guided into the electric machine space via stator channels. The coolant that collects under the effect of gravity on the housing bottom of the electric machine can be guided via suction from the housing interior in the direction of a coolant tank.

In the above-described coolant-hydraulic circuit, a coolant/air mixture can form in the electric machine space during electric machine operation and move in a vortex flow around the rotor shaft. In the same way, a coolant/air mixture can also move in a vortex flow around the rotor shaft in the free space.

An effective coolant supply to the free space is important for sufficient cooling of the rotary bearing. For this purpose, the electric machine housing wall has a catch contour according to the invention. Coolant present in the electric machine compartment collects on the catch contour. The coolant collected on the catch contour is guided to the free space via the inlet.

According to the invention, the catch contour has an axial web projecting in the axial direction from the inside of the electric machine housing wall in the direction of the electric machine space. This extends at least partially in the circumferential direction. According to the invention, at least one catch rib is drawn up radially outwards from the axial web. An inner corner area is spanned between the axial web and the catch rib, in which coolant drops can collect. The inlet opens directly into the inner corner area with an inlet opening. The inner corner area is designed to be open, in particular against the flow direction of the vortex flow, in order to capture a sufficient amount of coolant.

In a preferred embodiment variant, the catch contour can be designed for a direction of rotation reversal of the electric machine. In this case, the catch contour can have two inner corner areas. These can be spaced apart from one another in the circumferential direction. The first inner corner area can be designed to be open clockwise when viewed in the circumferential direction. In contrast, the second inner corner area can be designed to be open counterclockwise.

The free space is delimited radially outwards by the inner circumference of the hub section of the electric machine housing wall. A lower inner circumferential area forms a free space bottom. A coolant reservoir can be formed in the free space bottom, in which coolant collects and can be discharged via the outlet. Preferably, an overflow edge of the outlet opening can be spaced apart from the free space bottom by an overflow height. As soon as a coolant level rises to the overflow edge, coolant is discharged in the direction of the electric machine space.

The rotary bearing can be constructed conventionally, namely from an inner bearing ring seated on the rotor shaft, an outer bearing ring seated on the inner circumference of the hub section, and intermediate roller bodies. The rotary bearing delimits the free space in the axial direction toward the housing interior. An excessively large coolant return flow from the coolant reservoir via the rotary bearing in the direction of the electric machine space can result in increased bearing friction. Against this background, the overflow edge of the outlet opening is positioned a height offset below the outer bearing ring inner circumference of the rotary bearing. In this way, coolant return flow via the rotary bearing into the electric machine space is prevented.

In a specific embodiment variant, a shaft end of the rotor shaft can be rotatably mounted in the bearing arrangement. The electric machine housing wall can also be constructed in two parts, having a radially outer wall part that delimits a component access and an end shield using which the component access is closable. In this case, the bearing arrangement is arranged directly in the end shield.

BRIEF DESCRIPTION OF THE FIGURES

An exemplary embodiment of the invention is described hereinafter on the basis of the appended figures. In the figures.

DETAILED DESCRIPTION

Figure 3:
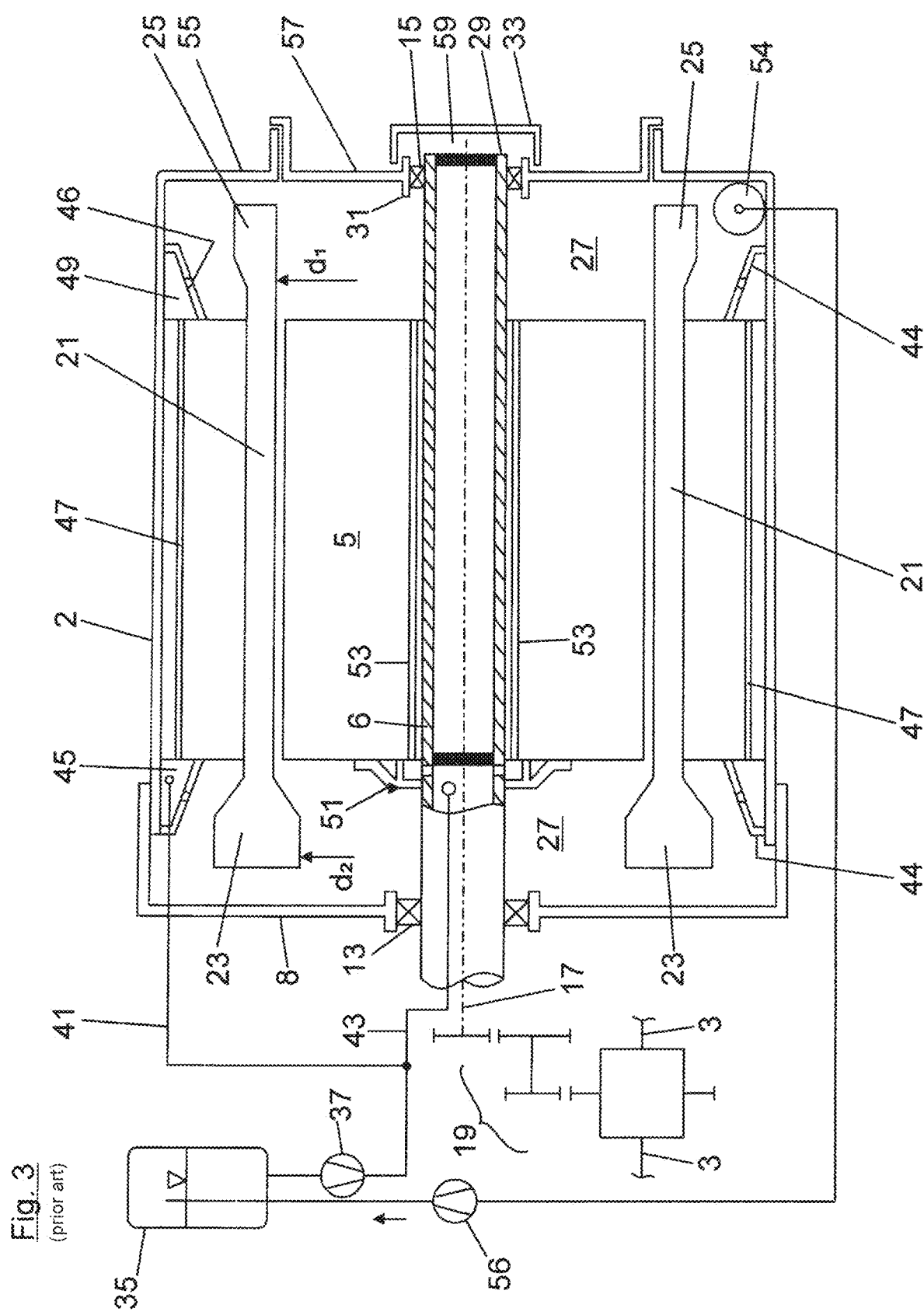
FIG. 3 shows a rough schematic illustration of a comparative example of an electric machine not comprised by the invention.

For a simpler understanding of the invention, reference is first made to FIG. 3, in which a drive device for a vehicle axle of a two-track vehicle is indicated in a rough schematic illustration. The drive device has an electric machine, which is arranged, for example, in transverse installation, axially parallel to the flange shafts 3 guided to the vehicle wheels. A stator 4 with a rotor 5 interacting therewith is arranged in a housing 2 of the electric machine. The rotor shaft 6 is rotatably mounted on axially opposite housing walls 8, 9 of the electric machine housing 2 in bearing openings with rotary bearings 13, 15 interposed.

The rotor shaft 6 of the electric machine can, for example, be connected in a rotationally fixed manner via a spline to a transmission input shaft 17 of a transmission arrangement 19, which outputs on the two flange shafts 3.

Figure 1:
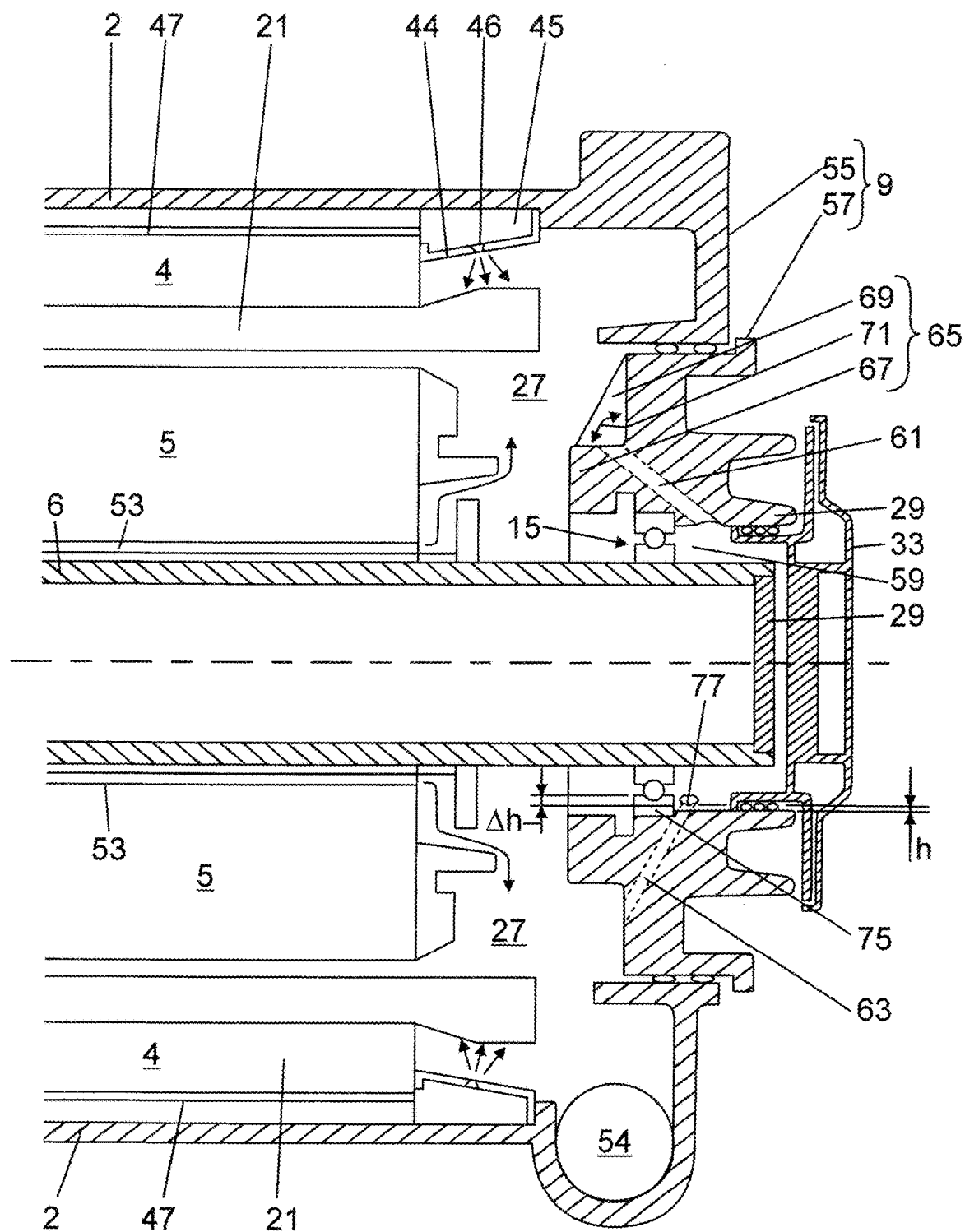
FIG. 1 shows an enlarged partial sectional view of an electric machine.

In FIG. 1, the stator 4 has a large number of stator windings, of which only two stator windings 21 are indicated in FIG. 1. Each stator winding 21 has a winding head 23, 25 on both axial sides, which protrudes into an electric machine space 27. Each electric machine space 27 is integrated into an oil-hydraulic circuit described later, with the aid of which oil can be applied to the respective electric machine space 27 in order to cool the winding heads 23, 25 of the stator 4. In each of the electric machine spaces 27, an oil/air mixture moves in a vortex flow around the rotor shaft 6, which rotates at high speed.

In the bearing arrangement on the right in FIG. 3, a shaft end 29 of the rotor shaft 6 is rotatably mounted. The shaft end 29 of the rotor shaft 6 is guided through a hub section 31 of the housing wall 9, with the rotary bearing 15 interposed. The bearing opening delimited by the hub section 31 is sealed to the outside of the housing by a cover-shaped sealing element 33.

The oil-hydraulic circuit has an oil tank 35, which is connected to a suction pump 37 via a suction line. A pressure line leads from the suction pump 37 to oil supply lines 41, 43. Oil is fed into a radially outer circumferential annular gap 45 by means of the supply line 41. From there, the oil is guided via radially outer stator channels 47 to a further annular gap 49 in the right electric machine space 27. The two annular gaps 45, 49 are separated from the respective electric machine space 27 via oil spray rings 44. Each of the oil spray rings 44 has nozzles 46 distributed in the circumferential direction, via which oil is injectable into the respective electric machine space 27.

By means of the supply line 43, oil is guided through the rotor shaft 6 and via a flow connection 51 in radially inner stator channels 53 into the right electric machine space 27. On the housing bottom of the electric machine housing in FIG. 3 there is a suction 54, via which oil collecting on the bottom of the housing is returnable to the oil tank 35 with the aid of a return pump 56.

As can be seen from FIG. 3, the winding heads 25 projecting into the right electric machine space 27 delimit an inner circumference which lies on a diameter d1. The winding heads 23 projecting into the left electric machine space 27 delimit an inner circumference which lies on a diameter d2 that is smaller than the diameter d1. The winding heads 25 are located on the switching side of the electric machine to which the power electronics (not shown) are connected, while the winding heads 23 are located on the counter-switching side.

In order to ensure an interference contour-free installation of the rotor 5 together with the rotor shaft 6 when assembling the electric machine, the electric machine housing wall 9 is constructed in two parts in FIG. 3, namely from a radially outer wall part 55, which delimits a component access, and a radially inner end shield 57, using which the component access is closable. The rotor 5 is The bearing arrangement for the rotational mounting of the shaft end 29 of the rotor shaft 6 is formed directly in the end shield 57. The component access is dimensioned such that the rotor 5 is insertable into the electric machine housing 2 without any interference contours. After the setting process has been completed, the end shield 57 is mounted on the radially outer wall part 55.

Figure 2:
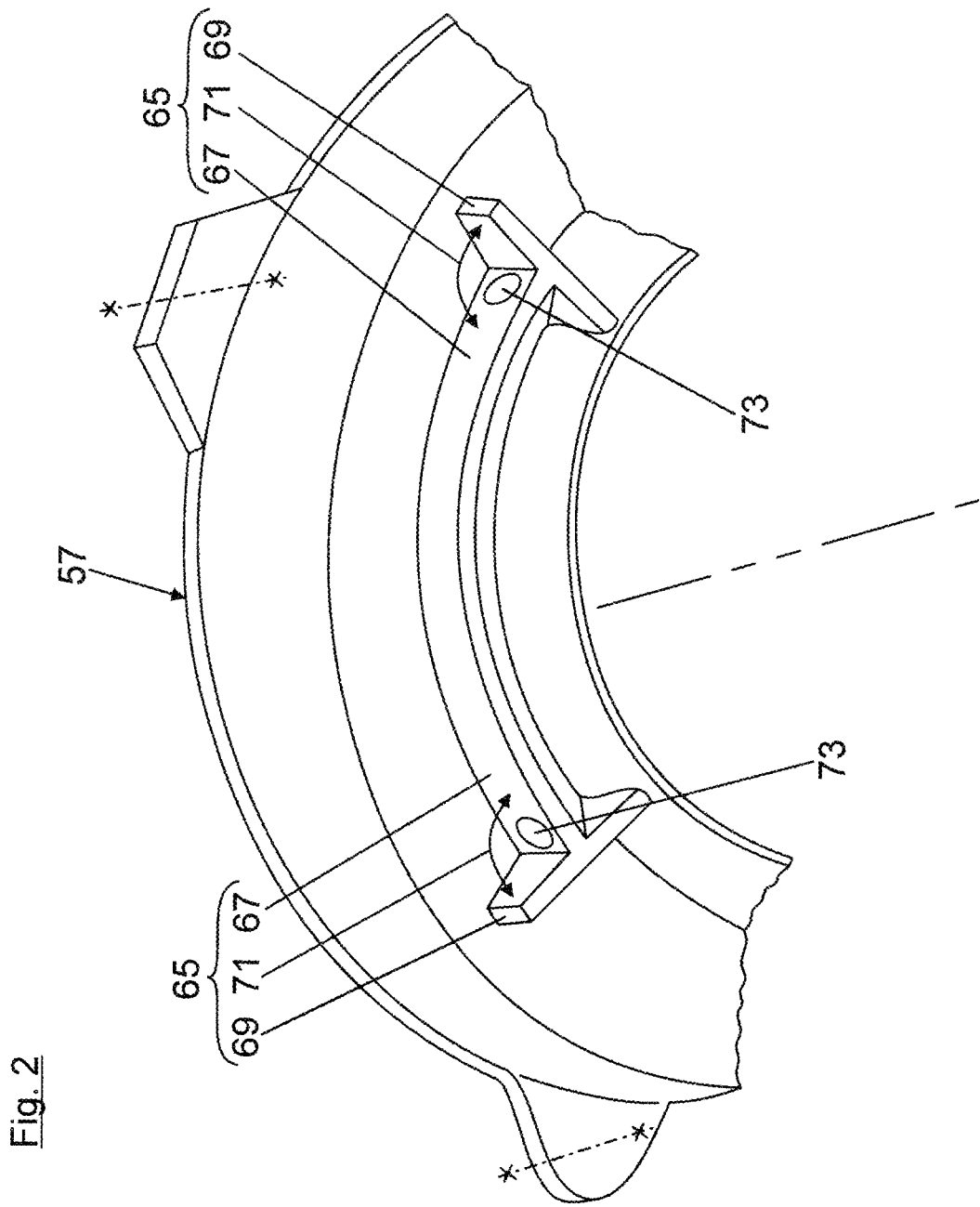
FIG. 2 shows a catch contour formed on an end shield.

A core concept of the invention relates to the geometry of the end shield 57, as shown in FIGS. 1 and 2. As a result, the end shield 57 has an oil connection via which oil can be guided from the right electric machine space 27 into the free space 59. In FIG. 1 or 3, the free space 59 extends in the axial direction between the rotary bearing 15 and the cover-shaped sealing element 33. In addition, the free space 59 is delimited radially outward by the hub section 31 of the housing wall 9 and delimited radially inward by the shaft end 29 of the rotor shaft 6.

The oil connection has an oil inlet 61 and an oil outlet 63 in FIG. 1. The oil inlet 61 is located above the free space 59 in FIG. 1, while the oil outlet 63 is located below the free space 59. During electric machine operation, oil can therefore be guided from the electric machine space 27 via the oil inlet 61 into the free space 59 under the effect of gravity. In the further course, the oil can be returned from the bottom of the free space 59 to the electric machine space 27 via the oil outlet 63 under the effect of gravity.

In FIG. 2, an oil reservoir is formed on the free space bottom, in which the oil collects and can be discharged via the oil outlet 63. According to FIG. 2, a outlet opening of the oil outlet 63 has an overflow edge 77, which is spaced apart from the free space bottom by an overflow height h. The overflow edge 77 of the outlet opening is positioned by a height offset Δh below an inner circumference of the outer bearing ring 75 of the rotary bearing (15). In this way, direct coolant return flow via the rotary bearing 15 into the electric machine space 2 is prevented.

As can furthermore be seen from FIG. 1 or 2, the housing wall 9 has a catch contour 65 on its inside. Existing oil drops collect on the catch contour 65 in the electric machine space 27. The collected oil is guided to the free space 59 via the oil inlet 61. In FIGS. 1 and 2, the catch contour 65 has an axial web 67 which projects axially from the housing wall inside in the direction of the electric machine space 27. This partially extends in the circumferential direction. According to FIG. 1 or 2, two catch ribs 69 are drawn up radially outward from the axial web 67. The two catch ribs 69 are spaced apart from one another in the circumferential direction. An inner corner area 71 is spanned between each of the catch ribs 69 and the axial web 67. The oil collects in the inner corner area 71. In addition, the oil inlet 61 opens into the inner corner area 71 with an inlet opening 73.

The catch contour 65 shown in FIG. 2 is designed for a direction of rotation reversal of the electric machine. For this purpose, the two inner corner areas 71 are each designed to be open in different circumferential directions. This means that a first inner corner area 71 is designed to be open against the flow direction of the vortex flow in the electric machine space 27, independently of the direction of rotation of the electric machine.

LIST OF REFERENCE SIGNS 2 electric machine housing
3 flange shafts
4 stator
5 rotor
6 rotor shaft
8, 9 housing wall
11 bearing opening
13, 15 rotary bearings
17 transmission input shaft
19 transmission arrangement
21 stator winding
23, 25 winding head
27 electric machine space
29 shaft end
31 hub section
33 sealing element
35 coolant tank
37 suction pump
41, 43 supply lines
44 oil splash ring
45 annular gap
46 nozzles
47 radial outer stator channel
49 annular gap
51 flow connection
53 radial inner stator channel
54 suction
55 radial outer wall part
56 return pump
57 end shield
59 free space
61 inlet
63 outlet
65 catch contour
67 axial web
69 catch rib
71 inside corner area
73 inlet opening
75 bearing outer ring
77 overflow edge

The invention claimed is:

1. A coolant supply system for an electric machine, in which a free electric machine space is provided in the axial direction between the rotor/stator arrangement and an electric machine housing wall, to which coolant can be applied, wherein the electric machine has a rotor shaft bearing arrangement in which the rotor shaft is rotatably mounted in a hub section of the electric machine housing wall via a rotary bearing, wherein the bearing opening is sealed to the outside of the housing using a sealing element, with the formation of a free space between the rotary bearing and the sealing element, wherein
the electric machine housing wall has a coolant connection, via which coolant from the electric machine space can be guided into the free space, and wherein
the electric machine housing wall has a catch contour on which coolant present in the electric machine space collects and can be guided via an inlet to the free space, wherein
to provide an inner corner area, the catch contour has an axial web which projects in the axial direction from the inside of the electric machine housing wall in the direction of the electric machine space and which extends at least partially in the circumferential direction, wherein
at least one catch rib is drawn up radially outwards from the axial web, and
wherein the catch contour acts independently of the direction of rotation of the electric machine, and wherein the catch contour has two inner corner areas which are spaced apart from one another in the circumferential direction, and wherein the first inner corner area, viewed in the circumferential direction, is designed to be open clockwise and the second inner corner area is designed to be open counterclockwise.

2. The coolant supply system according to claim 1, wherein the coolant connection has an inlet and an outlet, and the coolant can be guided into the free space via the inlet, in particular under the effect of gravity, and/or in that the coolant can be returned from the free space into the electric machine space via the outlet, in particular under the effect of gravity.

3. The coolant supply system according to claim 2, wherein the electric machine space is integrated in a hydraulic circuit, by which coolant can be guided into the electric machine space, and wherein coolant collecting on the housing bottom of the electric machine under the effect of gravity can be guided via a suction out of the housing interior.

4. The coolant supply system according to claim 2, wherein the catch contour has at least one inner corner area, which is designed to be open against the flow direction of the coolant vortex flow.

5. The coolant supply system according to claim 2, wherein the inner corner area is spanned between the axial web and the catch rib, in which the coolant collects, and wherein the inlet opens into the inner corner area with an inlet opening.

6. The coolant supply system according to claim 2, wherein the catch contour acts independently of the direction of rotation of the electric machine, and wherein the catch contour has two inner corner areas which are spaced apart from one another in the circumferential direction, and wherein the first inner corner area, viewed in the circumferential direction, is designed to be open clockwise and the second inner corner area is designed to be open counterclockwise.

7. The coolant supply system according to claim 1, wherein the electric machine space is integrated in a hydraulic circuit, by which coolant can be guided into the electric machine space, and wherein coolant collecting on the housing bottom of the electric machine under the effect of gravity can be guided via a suction out of the housing interior.

8. The coolant supply system according to claim 7, wherein the catch contour has at least one inner corner area, which is designed to be open against the flow direction of the coolant vortex flow.

9. The coolant supply system according to claim 7, wherein the inner corner area is spanned between the axial web and the catch rib, in which the coolant collects, and wherein the inlet opens into the inner corner area with an inlet opening.

10. The coolant supply system according to claim 7, wherein the catch contour acts independently of the direction of rotation of the electric machine, and wherein the catch contour has two inner corner areas which are spaced apart from one another in the circumferential direction, and wherein the first inner corner area, viewed in the circumferential direction, is designed to be open clockwise and the second inner corner area is designed to be open counterclockwise.

11. The coolant supply system according to claim 1, wherein the catch contour has at least one inner corner area, which is designed to be open against the flow direction of the coolant vortex flow.

12. The coolant supply system according to claim 11, wherein the inner corner area is spanned between the axial web and the catch rib, in which the coolant collects, and wherein the inlet opens into the inner corner area with an inlet opening.

13. The coolant supply system according to claim 11, wherein the catch contour acts independently of the direction of rotation of the electric machine, and wherein the catch contour has two inner corner areas which are spaced apart from one another in the circumferential direction, and wherein the first inner corner area, viewed in the circumferential direction, is designed to be open clockwise and the second inner corner area is designed to be open counterclockwise.

14. The coolant supply system according to claim 1, wherein the inner corner area is spanned between the axial web and the catch rib, in which the coolant collects, and wherein the inlet opens into the inner corner area with an inlet opening.

15. The coolant supply system according to claim 14, wherein the catch contour acts independently of the direction of rotation of the electric machine, and wherein the catch contour has two inner corner areas which are spaced apart from one another in the circumferential direction, and wherein the first inner corner area, viewed in the circumferential direction, is designed to be open clockwise and the second inner corner area is designed to be open counterclockwise.

16. The coolant supply system according to claim 1, wherein a coolant reservoir is formed on the free space bottom, in which coolant collects and can be discharged via the outlet, and wherein in particular an overflow edge of the outlet opening of the outlet is spaced apart from the free space bottom by an overflow height, and wherein the overflow edge of the outlet opening is positioned by a height offset below an outer bearing ring inner circumference of the rotary bearing, so that coolant return flow via the rotary bearing into the electric machine space is at least inhibited.

17. The coolant supply system according to claim 1, wherein a shaft end of the rotor shaft is rotatably mounted in the bearing arrangement, and/or wherein the free space extends in the axial direction between the rotary bearing and the sealing element and is delimited radially inwards by the rotor shaft and/or is delimited radially outwards by the hub section of the electric machine housing wall.

18. The coolant supply system according to claim 1, wherein the electric machine housing wall is constructed in two parts, namely with a radially outer wall part, which delimits a component access, and an end shield, using which the component access is closable, and wherein the bearing arrangement is arranged in the end shield.

* * * * *